Sept. 16, 1958         H. A. QUIST         2,851,883
LIQUID LEVEL MEASURING APPARATUS
Filed Sept. 21, 1955         4 Sheets-Sheet 1

INVENTOR.
HAROLD A. QUIST
BY
ATTORNEY

INVENTOR.
HAROLD A. QUIST
ATTORNEY

Sept. 16, 1958  H. A. QUIST  2,851,883
LIQUID LEVEL MEASURING APPARATUS
Filed Sept. 21, 1955  4 Sheets-Sheet 4
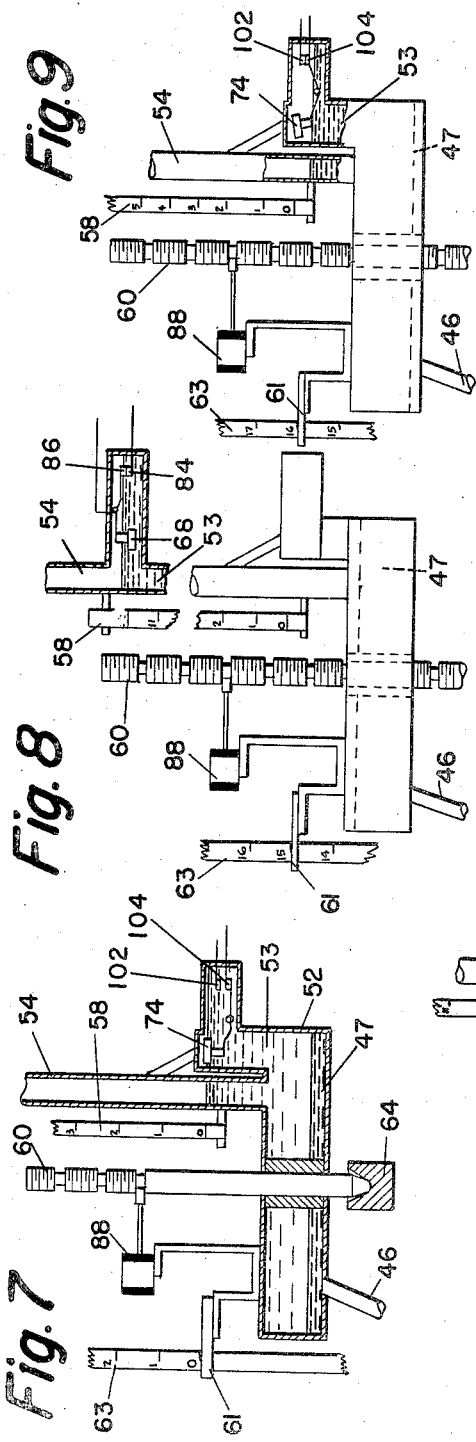
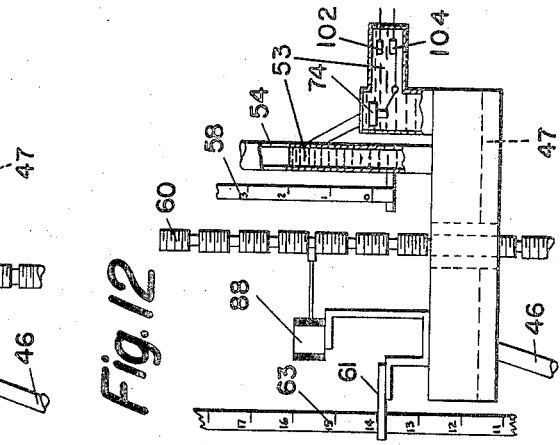
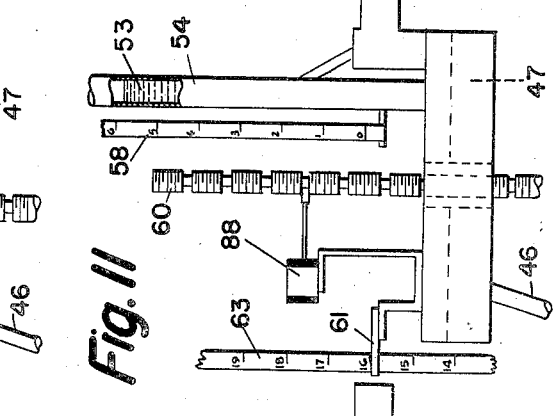
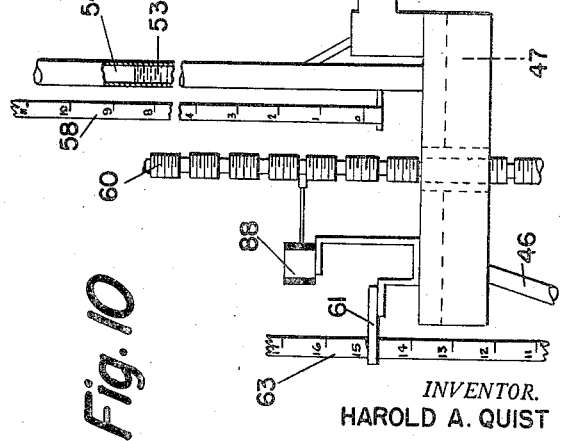
INVENTOR.
HAROLD A. QUIST
BY
ATTORNEY United States Patent Office 2,851,883
Patented Sept. 16, 1958

2,851,883
LIQUID LEVEL MEASURING APPARATUS

Harold A. Quist, Swarthmore, Pa., assignor to Sun Oil Company, Philadelphia, Pa., a corporation of New Jersey Application September 21, 1955, Serial No. 535,612

11 Claims. (Cl. 73—316)

This invention relates generally to liquid level measuring devices and more particularly to pressure responsive means which operate electrically to show the level of stored bodies of liquid.

Several pressure responsive liquids, non-miscible and of different specific gravities, arranged in pressure exchange relationship, are discussed as parts of liquid level indicating and measuring apparatus in my Patent Number 2,760,373, issued August 28, 1956, and also in my application Serial Number 509,880, filed May 20, 1955. Both of these applications show complete mechanisms and generally divide the apparatus into two parts, a liquid level sensing section, and an indicating or measuring section. The liquid level sensing portion of the device shown here is also common to both prior applications. All the applications differ in the indicating or measuring section. It is the principal object of this invention to provide an improved liquid level measuring means constantly responsive to changes in the level of stored liquid bodies.

A further object is to provide a liquid level indicating means which accurately responds to stored liquid level changes transmitted thereto as a function of liquid pressure free of the characteristics of the stored liquid.

Still a further object of this invention is to provide a liquid level indicator, liquid operated, which amplifies pressure changes resulting from variations in stored liquid levels for accurate fractional reading of adopted depth scales.

And yet another object of this invention is to provide a liquid level indicator which reduces the indicated range of liquid level variation to a fraction of the stored liquid depth still retaining accuracy and reading ease.

Three volumes of non-miscible liquids are used to transmit the operating pressure from the level of the stored liquid to the indicating mechanism. One volume of relatively low specific gravity liquid fills the liquid level sensing mechanism suspended in the stored liquid volume. A higher specific gravity liquid, with consequent reduced pressure response and resulting movement in the system, is positioned to receive pressure from the low specific gravity liquid in the liquid level sensing means. This second liquid is conducted directly to a vertically movable cell arranged to indicate the measured stored-liquid level. The third volume of liquid referred to is used in the cell and extends upwardly into a vertical leg fitted with spaced-apart float responsive electrical contacts. This last liquid is a low specific gravity liquid which may be the same as the initial liquid used in the stored liquid level sensing sub-combination. Whether the same or another form of low specific gravity liquid, its response in the vertically movable cell is proportional to the initiated pressure in the system, and greater than the response of the high specific gravity intermediate liquid in proportion to the relative specific gravities.

The pressure response of the lower specific gravity liquid in the cell, transmitted by the intermediate higher specific gravity liquid, excites electrical circuits for either upward or downward movement of the cell, as required. One unit of vertical movement of the cell measured in terms of the specific gravity of the higher specific gravity liquid causes a response of many like units between the float contacts of the lower specific gravity liquid, due to physical construction and relationship of liquid specific gravities. This relative movement between the liquids in the level sensing device and the measuring cell, and the proportionately reduced response of the intermediate high specific gravity liquid, affords accurate determination of the level of liquid in a stored volume with extended depth variation on a device of limited vertical travel.

With the above noted, and other, objects in view, the invention consists in the arrangement and combination of parts hereafter described, claimed and shown in preferred form in the drawing, in which:

Figures 7 to 12 are partial elevational views of the responsive elements of the measuring mechanism illustrating its operation.

Figure 1:
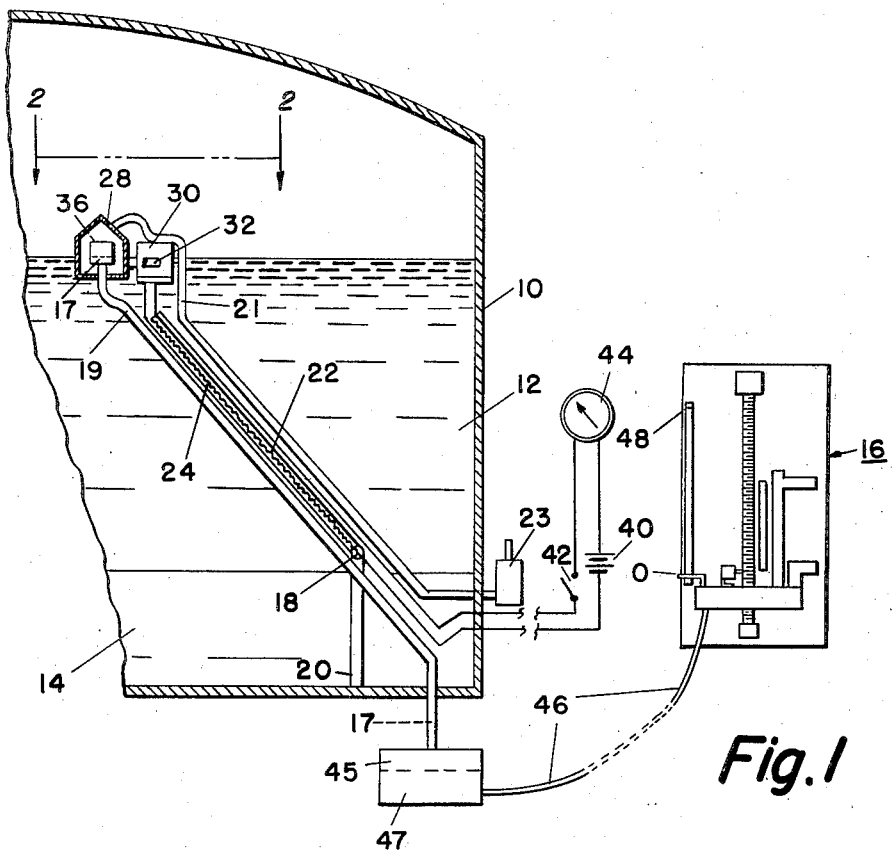
Figure 1 is an elevational view partly in section, graphically representing the device as applied to a body of stored liquid in a tank.

Referring now to the figures of the drawing, Figure 1 illustrates the elements of the disclosed mechanism in relative operating position. A storage tank 10, of a type used in the petroleum industry and known as a "fixed roof type" is shown supporting a body of hydrocarbon liquid 12 above a water base 14. This is common practice for safety and conservation reasons and is included here to assist in determining the location of the liquid level indicating device, inclusively numbered 16, relative to the vertical extent of the stored liquid.

In this instance, as it is not the purpose of liquid level measuring device 16 to measure the depth of the water base 14, but is to measure the depth of volume 12, and within the limits of restricted travel as fully explained later, the device 16 is positioned vertically to measure depth of the liquid 12, exclusive of the water 14. This is accomplished by adjusting the zero measurement, as reflected by device 16, at the pressured height of the interface between the water 14 and hydrocarbon liquid 12 volumes. By adjusting the measuring device 16 vertically relative to storage tank 10, and further adjusting the scales adjacent the elements of the unit, this can be readily accomplished (Fig. 7). Further adjustment, to achieve this end, will suggest itself to those versed in the art, after reading the following description. With this accomplished, changes in the hydrocarbon liquid level reflected by differences in depth which proportionately affect the pressure transmitted to the indicating or measuring device 16, will reflect only changes of the hydrocarbon liquid volumes. It will be evident, also, that by changing the vertical position of the measuring device 16, selected strata of liquid in the complete stored volume may be measured, if desired.

Figure 2:
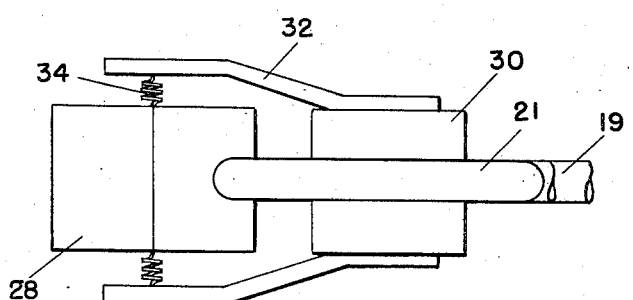
Figure 2 is an enlarged section of Figure 1, taken along line 2—2.

Cooperating with this vertical placement of device 16, hinge support 18 in tank 10 is lifted vertically as by bracket 20 to the maintained level of water 14 and pivotally supports an elongated member 24 the opposite end of which is free to move upwardly and downwardly with the petroleum liquid level changes. A pressuring liquid 17, of low specific gravity such as dilute glycol, contained in tube 19 as a liquid column of relatively small cross section, and the additional weight of the atmosphere conducting tube 21, together with the electrical conductors 22 of the temperature detecting device, are positioned to parallel the elongate member 24. Double floats 28 and 30 connected to the free end of member 24 supports these elements in parallel relation in the liquid petroleum suspended to extend downwardly from the liquid surface to be measured. Figure 2 shows the floats 28 and 30 linked in tandem by a yoke 32 and a flexible wire connector 34 which permits flexibility necessitated for relative movement between extreme positions.

Whereas the float 30 is a simple hollow container serving no other purpose than to buoyantly support the listed elements with the help of float 28, this latter float 28, floating free, serves other purposes. Within the body of the float 28, a cup 36 is mounted to receive the upper end of the tube 19 into the bottom thereof. The liquid 17 which fills the tube 19 is free to enter the cup and leave it as the float 28 lifts and falls. By adjusting the quantity of light weight liquid 17 in the float 28 and tube 19, the level of the stored liquid 12 can be substantially approximated by pressure exchange for all changes in elevation within the normal operating limits. Also tube 21, connected to the atmosphere outside the tank 10 through the air drier container 23 equalizes the pressure on the liquid level sensing end of the liquid indicating device with a like atmospheric pressure at the end of the indicator, as will be fully understood after reading the description of the operation of the complete device.

The temperature sensing elements are shown here as a simple electrical conductor 22 mounted on elongate member 24 to be adjacent the pressuring liquid column 17 throughout its effective length in the stored liquid being measured. Electrical energy from a power source, such as the battery 40, is passed through the conductor 22 by operation of the switch 42. The conductor 22 is selected for its variable conductivity in response to temperature changes. An indicator 44, calibrated to read temperatures as a function of this change in conductivity of conductor 22, is connected therewith.

The liquid level measuring device, generally noted by numeral 16, and shown in varying degrees of detail in Figures 1 and 3 to 6, inclusive, will be described in detail. It will be recognized that this sub-combination of the liquid level measuring mechanism can be used with the above described level sensing sub-combination, or with any other liquid level sensing device capable of transferring a measuring liquid pressure as a function of stored liquid surface elevation. For example, the liquid level sensing mechanism for floating roof tanks also described in the application of reference, Serial Number 327,726, will work equally as well. The liquid level sensing contrivance described here is the fixed roof device disclosed in that application and shows one form of a complete and operating mechanism for descriptive purposes.

Figure 3:
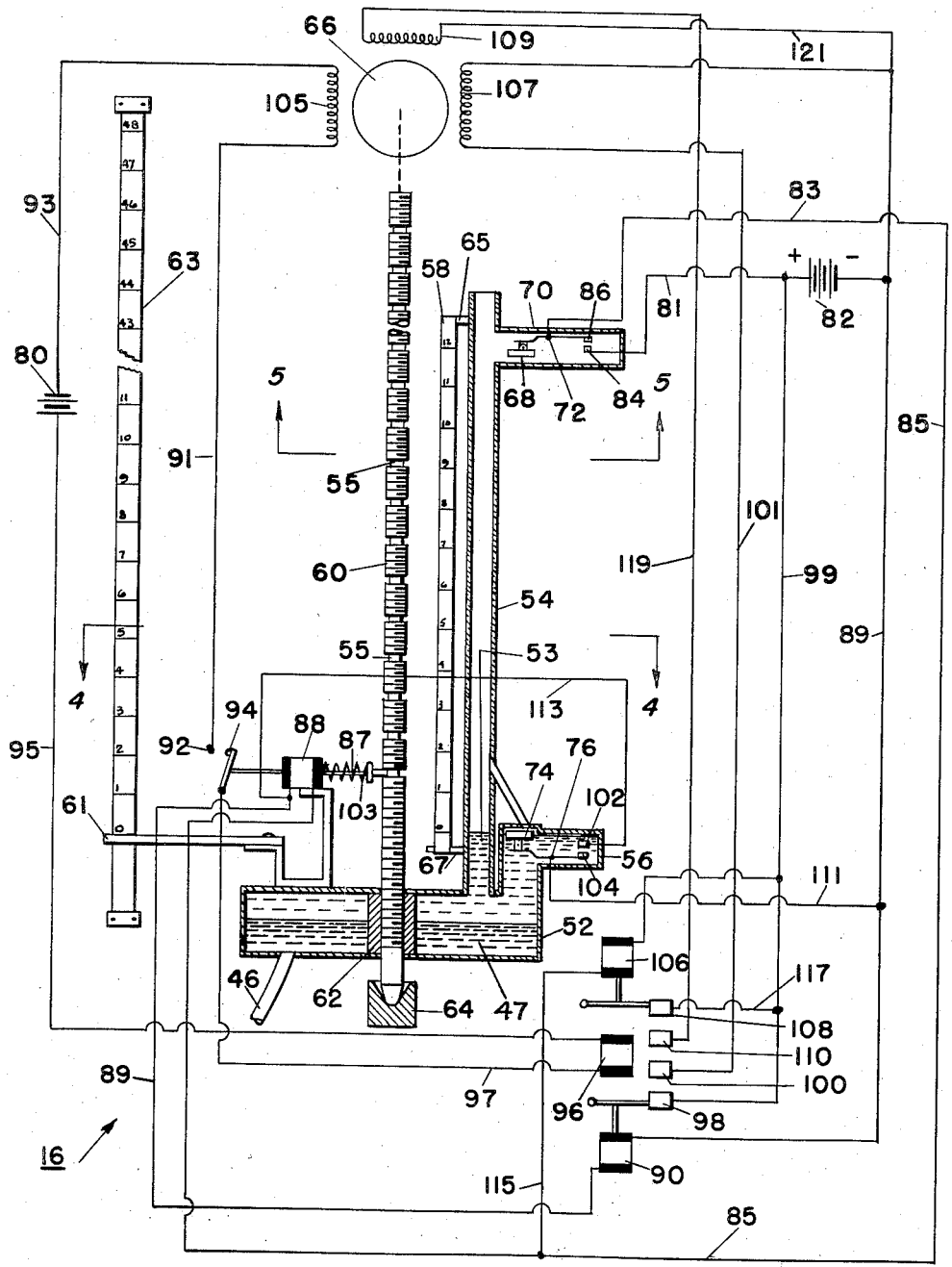
Figure 3 is an elevational view of the liquid level indicating element of Figure 1.
Figure 4:
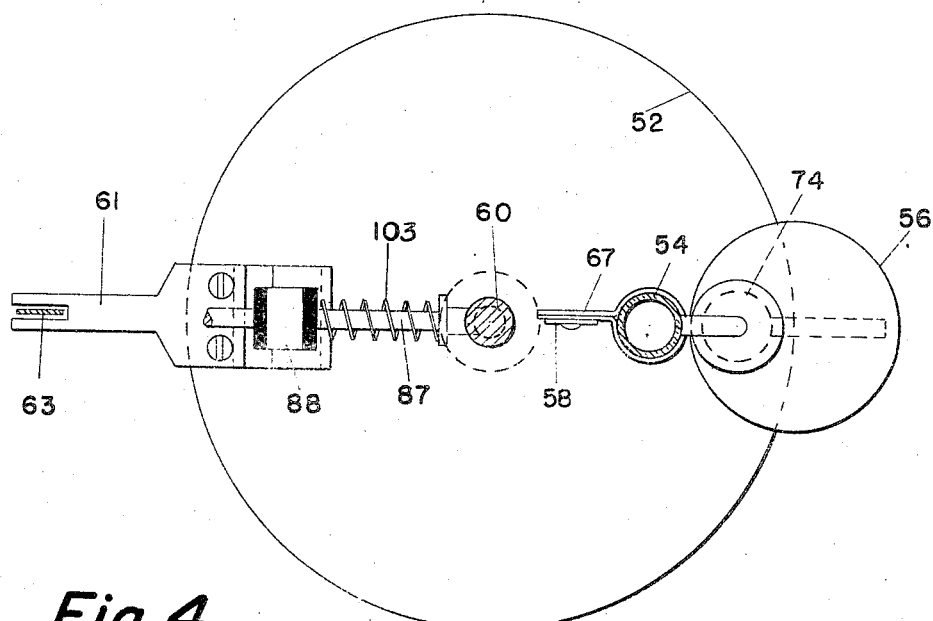
Figure 4 is a sectional view of Figure 3 taken on line 4—4.
Figure 5:
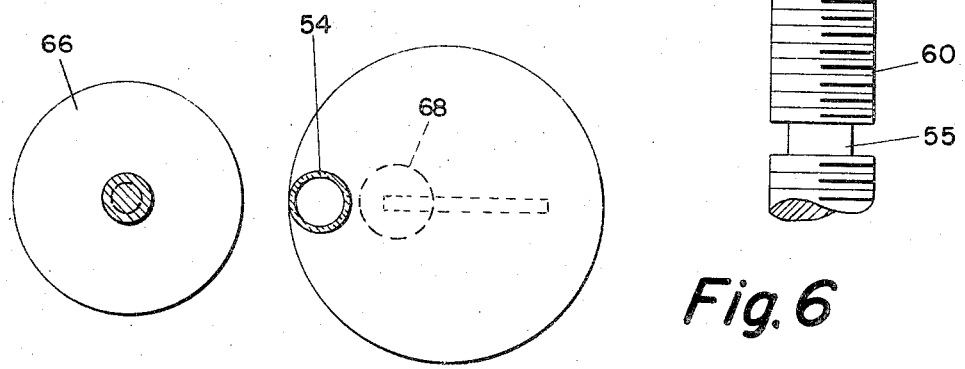
Figure 5 is a sectional view of Figure 3 taken on line 5—5.
Figure 6:
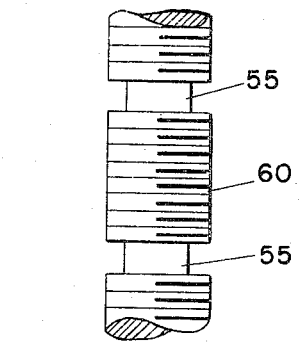
Figure 6 is an enlarged view of the detail of construction of an element of Figure 3.

Referring to Figure 1 together with Figure 3, the liquid level measuring device 16 of this application is connected to receive liquid pressure indications from pressuring liquid 17 through tube 19 connected to a sealed container 45 (Fig. 1) positioned intermediate the storage tank 10 and the measuring device 16. The low specific gravity liquid 17, suggested as dilute glycol or the like noted above, contacts a high specific gravity liquid 47 such as mercury, non-miscible with liquid 17, in container 45 and pressure is transmitted to the vertically movable pressure cell 52 of the measuring device 16 through conduit 46. Conduit 46 is shown dashed proximate measuring device 16 (Fig. 1) to indicate the flexibility required when cell 52 moves upwardly in balancing the pressure of the high specific gravity liquid against the hydraulic head of the low specific gravity liquid supported in the storage vessel 10. The flexibility and length of conduit 46 must be sufficient to allow the vertically travelling parts of the measuring device to reach the full limits required in measuring the specific tanks or tanks to which it is attached. As illustrated in the drawing, the pressure transmitted from container 45 through conduit 46 by high specific gravity liquid 47 is immediately effective against the low specific gravity liquid 53 in the measuring mechanism. This liquid 53 can be dilute glycol, duplicating the initial volume in the surface sensing element, or any like liquid, preferably a lower specific gravity liquid and one for which the specific gravity relationship with the heavier liquid is easily established and capable of clear marking on scales.

Pressure cell 52, of any convenient shape but shown here in a cylindrical form (Figures 3 and 4) is dimensioned to receive a reasonable pressure result of a limited height movement in response to the level sensing means in any specific storage tank. As there is no appreciable flow of liquid in this device, both ends being opened to atmospheric pressure to eliminate basic pressure differences, and the column section of the pressure sensing liquid being very small, this pressure cell 52 need not be large. However, the size is purposely selected to have sufficient cross-sectional area in the cell with relation to the cross-sectional area of leg 54 to cause the lighter weight liquid to raise the full operating distance in response to substantially a negligible change in elevation of the heavier liquid. Thus the counterbalancing pressure effect of the column of liquid in the leg 54 of much reduced cross-section is effective to restrict the pressure change in the cell with almost negligible heavy liquid movement. Further, as it moves vertically in response to the actuation of the liquid level sensing elements it is not called upon to receive any large quantity of pressuring liquid. This is especially true where the specific gravity of the heavier liquid is so much greater than the lighter liquid used. As will be more fully understood later, one unit of pressure response in the heavier liquid which the pressure cell 52 is vertically moved to compensate is very small relative to the movement of the lighter liquid which both initiates and measures that movement. With maximum dimensions of the device controlled by the pressure effect of the high specific gravity liquid responding to the sensing device, plus a quantity of low specific gravity, non-miscible liquid 53 above it in cell 52 and legs 54 and 56, the volume, and resultant dimensions, are determined.

Tubular extension or leg 54, extending vertically upward from pressure cell 52 and open at the top, is of limited cross-sectional area, and of a length determined by the relative specific gravities of the liquids used in pressure exchange relation. In relation to the cross-sectional area of cell 52, leg 54 is of small sectional area, limiting the vertical displacement of the heavier liquid to obtain a maximum elevational change in the body of the lighter liquid. Mercury, as the heavier liquid 47, specific gravity of 13.6, used with dilute glycol of a specific gravity of 1.1 as liquids 17 and 53, will require a length for tube 54 of 12.5 inches. This length, above a selected operating datum point as shown in Figure 3, corresponds to a unit of pressure of the mercury indicating a selected differential of height between levels of the stored liquid. Hence if the selected height differential is 1 foot in the stored liquid 12 with a corresponding difference in the mercury of 1 inch, 12.5 inches equals the equidistant pressure depth of glycol to counterbalance this unit of mercury pressure. If sub-divided into fractions of a foot, such as inches and parts of inches as shown on the scale 58 clamped on tubular leg 54, fractional heights of stored liquid levels are readable with great accuracy between established unit measurements indicated by the elevation of pressure cell 52 on threaded rod 60.

Rod 60 threaded to engage the threaded bushing 62 in pressure cell 52 is supported by bearing 64 on the bottom end and is rotatably engaged by reversible motor 66 on the upper end. Thus, by direction of rotation, reversible as described later, motor rotated threaded rod 60 will lift or lower pressure cell 52 as required. On the exterior of rod 60 as indicated in Figure 3 and shown in detail on Figure 6, the surface is grooved as at 55 to establish electro-mechanical control at selected units of stored liquid level heights, here established at the equal foot marks (one inch spacing for mercury, as liquid 47). By electrical switch cooperation with these notches, reversible motor 66 is checked until the fractional tubular leg 54 is either filled or emptied of the pressure responsive low specific gravity liquid 53 operating in it.

The upward movement of the measuring device is controlled by liquid 53 in tubular leg 54 as the rising level of the stored liquid varies the pressure transmitted to cell 52 by liquid 47 causing liquid 53 to rise or fall in leg 54. Float 68 supported in leg 54, as in offset chamber 70 by pivot 72, raises and lowers as liquid 53 engages and disengages it, at the uppermost extent of its travel distance. Leg 56 also extends upwardly from pressure cell 52 to position a second float 74, spaced from the upper float 68, at the effective lowest position of the pressure responsive movement of liquid 53. Similar to the first or upper float 68, this lower float is pivoted at 76 to respond to the effect of liquid 53 at the lower range of its operating position. Thus the upper float connection is made when supported by liquid 53 while the lower float connection is made when unsupported by that liquid, giving positive control at the spaced, operating interval of the relationship between the pressuring liquids 47 and 53.

Resistance against rotation of the cell 52 with all supported elements is obtained by using bifurcated clamp 61 positioned to indicate feet of depth in cooperation with scale 63. Inches and fractions of an inch indicated by the lower specific gravity liquid 53 in tubular extension 54 is read directly against scale 58 held onto the tube 54 by brackets 65 and 67. A scale etched directly on this tube, if made of glass or plastic, would serve equally as well.

An electrical circuit, with adequate power source, couples these floats and the reversible motor into a pressure responsive unit operating the liquid level measuring device. By means of interlocking holding devices, the reversible motor is enabled to run to complete a movement notwithstanding the increased or decreased pressure effects, or, in the alternative, the motor is not allowed to run until the pressure is stabilized. The elements, and their association, operating to achieve these results, are hereafter described in detail.

Reference to Figure 3 shows the electrical elements and circuit imposed on the above described mechanical elements of the liquid level measuring device 16. Power sources 80 and 82 symbolically indicate the operating power in relation to the several switch and contacting elements necessary to control the reversible motor. The upper float 70 on lifting, as illustrated in Figures 8 and 11, closes contacts 84 and 86 connecting the positive pole of power source 82 by conductors 81, 83 and 85 to the solenoid switch 88 mounted on pressure cell 52. A mechanical plunger 87 extends through the coil of solenoid switch 88 and either rests on the threaded surface of rod 60 or is urged into one of grooves 55 by resilient means 103 to mechanically assist the electrical switching operation at the selected elevational unit. Conductor 89, through solenoid 90, completes this operating circuit to the negative pole of power source 82.

By the electrical excitation of solenoid switch 88 contacts 92 and 94 are closed completing a circuit with power source 80 through motor 66 and conductors 91, 93, 95 and 97. Holding relay 96 is excited and maintained that way as long as solenoid 88 either electrically or mechanically keeps contacts 92 and 94 in operating engagement. As contact 98 was moved to engage contact 100 by solenoid switch 90 prior to the fixed field 105 of motor 66 being energized, holding relay 96 now maintains that position until contacts 92—94 separate.

Through contacts 98 and 100 conductors 99 and 101 complete a circuit with power source 82 exciting one directional field coil 107 in reversible motor 66. Rotary motion of proper direction is then transmitted to threaded rod 60.

Before completing the above description by a discussion of the operation of the device, the lower float mechanism electrical circuit will be described indicating the reversing operation. With the electrical circuits and their actuators completely detailed, a full understanding of the operation of the device will be easily grasped.

When unsupported by liquid as shown in Figure 9, the lower float 74 drops, causing engagement between contacts 102 and 104 and the negative pole of power source 82 is circuit connected to the positive pole through conductors 89, 111, 113 to solenoid switch 88, thence through conductors 85 and 115 to solenoid switch 106 to conductor 99 and the positive pole of power source 82. With the excitation of switch 88 the same procedure is set up as previously described, and holding relay 96 is excited to hold solenoid 106 and maintain contacts 108 and 110 in conducting engagement. A circuit, reversing motor 66 by exciting coil 109, is then established through conductors 99, 117, 119 and 121 to complete the power circuit. As before, but in the opposite direction of rotation, motor 66 performs the operation of vertically adjusting the position of the pressure cell 52 as indicated by the pressure.

To those versed in the art, it will be evident how the above device operates. However, to emphasize the flexibility of the disclosed mechanism, its accuracy and ease of operation, in addition to underlining the features which distinguish it from presently known devices in this field, an example of operation will be outlined and discussed with reference to Figures 7 to 12, inclusive, of the drawing. As stored liquid level surfaces both rise and fall in response to normal manufacturing and sales activities, in addition to minute changes in response to natural temperature and pressure changes, it is proposed to briefly discuss the disclosed mechanism's actions for both rising and falling liquid level conditions.

The elements constituting the device, as indicated above, require a physical relationship to be maintained only between the cell 52 and the leg 54, after zero setting as shown in Figure 7. This relationship, based on the relative specific gravities of the liquids used, is maintained to achieve the necessary vertical movement of the lighter liquid in response to negligible movement of the heavier liquid. As an example, a twenty inch diameter cell 52 of suitable depth cooperating with a leg 54 diameter of ⅛ inch requires a movement of .004 inch in the heavier liquid for 12 inch movement in the lighter liquid.

By using mercury as the higher specific gravity pressure liquid between diluted glycol as the liquid used in the liquid level sensing element and also in the measuring device, one foot change in liquid level of the stored liquid will be reflected at substantially one inch change in the elevation of pressuring cell 52. Therefore the grooves 55 on threaded rod 60 are substantially one inch apart, equally spaced, and repeated frequently enough to permit vertical travel of the measuring cell 52 over a distance representative of the storage tank's maximum vertical usage. Dilute glycol is used on both ends of the mercury, both as the low gravity liquid level sensing volume and as the inch and fraction of an inch indicating liquid in the vertically movable measuring mechanism. Thus the vertical movement of the sensing liquid is exactly reproduced in the measuring mechanism, reduced in elevation to a readable position by means of the heavier liquid lesser response and the vertical movement of the measuring elements.

As an example illustrating operation of the device, reference is made to Figures 7 to 12, inclusive, as above indicated. Assume that the level of the stored liquid is indicated as being at 15′—8½″ by the position of the bracket 61 being at the 15′ mark on scale 63 (see Figure 10) and the level of the lower specific gravity liquid in tubular leg 54 measuring 8½″ on the scale 58. Raising the liquid level in the stored volume a fraction of an inch, as by temperature increase, will move the liquid sensing-float supported liquid column in the tank a correspondingly small distance, increasing the effective pressure in pressuring cell 52 only sufficient to force the liquid level in tubular leg 54 a fraction, or at most an inch, more. This level of liquid 53 in leg 54 will reflect the actual level of stored liquid independent of atmospheric pressure, as leg 54 is open to atmosphere, and tube 21 of the sensing sub-combination conducts like pressure to the top of the sensing liquid column.

However, a pumping-in operation where the liquid level of the stored liquid is raised several feet or more above our assumed starting point causes full operation of the combined elements of the liquid level measuring mechanism. The float means suspending the column of pressuring liquid in the storage tank responds immediately, increasing the effective height of the pressuring column. Through the various conduits this increase in pressure is transmitted to pressuring cell 52 where the mercury responds by depth movement proportionate to its specific gravity with that of the stored liquid. The dilute glycol above the mercury responds, also, in proportion to its specific gravity relative to the mercury, occupying the space of 12.5 units in leg 54 for every pressure responsive movement of the mercury, as noted above. On reaching the upper float chamber 70 as shown in Figure 8, float 68 is lifted, causing electrical engagement between contacts 84 and 86. As described in relation to the electrical circuits, mechano-electrical operated switch 88 is retracted from the 15-foot groove mark of our example, establishing motor contact through engagement of contacts 92 and 94, and completing the relay 96 holding circuit (Figure 3). Contacts 98 and 100 are moved together and held by relay 96. With the excitation of motor field coil 107 threaded rod 60 directionally rotates to move pressure cell 52 upwardly to the next foot mark groove on rod 60.

As soon as cell 52 moves upwardly, tubular leg 54, being a part of this structure, moves also. Pressure in cell 52 decreases proportionately, dropping the column of liquid 53 away from its support of the upper float 68. Contacts 84 and 86 separate, breaking the circuit described above. However, due to mechano-electrical switch 88 now engaging the threaded surface of rod 60 having been electrically removed from the groove 55 in which it had been engaged, contacts 92 and 94 are mechanically maintained in contact until the switch is released by sliding into the next groove 55 above. As explained above, this occurs for each one foot increase, or decrease, in depth of the stored liquid. Switch 88 being held in contact, relay 96 remains energized, holding contacts 98 and 100 in operating engagement until the next foot mark or groove 55 is reached, releasing switch 88 and breaking the circuit. The motor then stops operating.

During the upward movement of pressure cell 52 and its associated leg 54, the decrease in pressure drops the dilute glycol liquid 53 downwardly in leg 54. If this is the end of the change in stored liquid level, it is obvious that there will be a balancing of pressures between the mercury and dilute glycol of the measuring device 16 and the column of mercury supported by the liquid level sensing means described cooperating with the tank.

However, it is only by accident that the level of the stored liquid will stop on an even foot mark. Presuming that it carries 5¾ inches further upward beyond the even foot mark, establishing a liquid level at 16′—5¾″ rising from the assumed elevation of 15′—8½″ of our example, switch 88 having been released from the mechanically held contact by slipping into groove 55 on rod 60, which establishes the 16 foot mark, glycol 53 in leg 54 receives the pressure from cell 52. There is not sufficient pressure to lift the glycol column into contact with the upper float 68, however, as there is only an additional elevation of 5¾″ to be counterbalanced. Consequently the electrical circuit will not be re-excited and the column of liquid 53 will lift, only, until 5¾″ is shown on scale 58 as in Figure 11.

It will be evident that the above description will cover all conditions of upward movement of the level of the stored liquid whether it be in small increments as described, or in a constant movement from bottom to top of the tank. The downward movement where the height of the stored liquid level is reduced as by a pumping out procedure will be readily understood from the above description. As pressure in the liquid column suspended by the level sensing means in the tank is reduced, this condition is transmitted to cell 52 through the several conduit and pressure chamber connections described. Pressure support of the dilute glycol column in leg 54 is reduced, allowing the support of lower float 74 to drop the float making engagement between electrical contacts 102 and 104 (Figure 9). Mechano-electrical switch 88 is excited and operates as previously described, energizing field 105 of motor 66, solenoid switch 106 and holding relay 96. Contacts 108 and 110 are brought into engagement, exciting field coil 109 in motor 66 and rotating rod 60 in reverse direction from that previously described (Fig. 3).

Cell 52 is moved downwardly until switch 88 meets the next below foot mark groove 55 where the circuit is broken. In this downward movement pressure is picked up in cell 52, as it continues downwardly without regard to pressure until the electrical circuit is broken, forcing glycol liquid 53 upwardly in tube 54. There is no re-excitation of the upwardly moving circuit, however, as the distance between floats 74 and 68 is a space equal to a foot of stored liquid depth and, since the circuit of operation was once established for a decreased foot of elevation, the pressure is decreased accordingly, and contact of the upper float mechanism is not made.

Two possibilities are therefore present, the stored liquid level can continue to decrease below another foot mark, or it can stop within inches of the surface depth from which it started. In either case, the balance of pressure affects cell 52 and the column of glycol in leg 54. Cell 52 always drops to the next foot mark below that of the level in the tank, or rises to the foot mark below that level in the increasing condition described above, thereby showing the differential under any and all conditions as a measure of inches and fractions of an inch on scale 58 to be added to the foot mark on rod 60. In Figure 12 the cell has dropped to 14 feet and the intermediate point of 2 inches is established by transmitted pressure in tube 54.

The one condition not yet described, but touched on above, is the measurement of slight liquid level variations in the stored liquid as caused by principally, temperature changes. It will be evident that temperature effects must always be considered. In the sale of petroleum products, inventorying, and other general evaluation procedures, a base temperature to which volumes and other characteristics are referred is established. Therefore the average temperature indicating mechanism associated with the level sensing sub-combination in the storage tank will be considered, properly, with the description of the effects of temperature on the liquid level measuring device 16.

Correction is made to exactly determine the "true" level of the liquid as contrasted with the "actual" level produced by temperature effect. By reading the average temperature of the stored liquid strata affecting the column of sensing liquid exposed to the liquid body in tank 10, a correction factor is available by which the measured liquid level reflected by measuring device 16 may be modified.

Within measuring device 16, the effect of temperature will cause the indicated elevation of the liquid level to follow the actual level. For example, a body of liquid in the tank, otherwise static, expanding or contracting because of temperature effect, raises or lowers the stored liquid level. This change is transmitted to cell 52 then to liquid 53 in leg 54. If the level change crosses a foot division as established, the float operated electrical contacts, one or the other, will position cell 52 at the basic mark from which the level of glycol in leg 54 will be the measure. Where a foot mark does not intervene, the temperature change will be reflected in leg 54 alone through the rise or fall of the level of liquid 53 therein, against scale 58.

A liquid level measuring device responsive to liquid pressure, capable of exact liquid level measurement of stored liquids to a high degree within a limited scale, is disclosed. The transfer of the pressure operating the device through operating liquids of different specific gravities together with electrically actuated elevational changing means for the measuring device, makes the accuracy and physical limitations of the device possible. It will be evident that the form disclosed here for purposes of description may be modified in many ways without changing the spirit of the invention. This is recognized by the inventor, who intends to be limited only by the scope of the appended claims.

What is claimed is:

1. A liquid level measuring system for use with stored liquid bodies comprising liquid level responsive means in the stored liquid body, a conduit enclosed liquid column supported by said liquid level responsive means, a vertically responsive pressure cell mounted externally of the stored liquid body connected to receive pressure from the liquid column, means to vertically move said pressure cell, and pressure-responsive means in said pressure cell in cooperative engagement with said vertical movement means.

2. The system described in claim 1 further characterized by said means to vertically move the pressure cell including a rotatable threaded shaft in operating engagement with said cell, and a reversible motor electrically responsive to changes in pressure from the liquid column.

3. The system described in claim 1 further characterized by the pressure responsive means in the pressure cell including a liquid of lower specific gravity than that of the liquid column and responsive over a greater vertical range, an upright leg mounted on said vertically responsive pressure cell to confine the liquid of lower specific gravity, float means placed in the upright leg in spaced relation separately responsive to the extremes of vertical movement of said liquid in the leg, a reversible motor operatively connected to raise and lower said cell, and circuit means connecting said float means and the motor in cooperative engagement.

4. A pressure responsive liquid level measuring system comprising a float suspended column of pressuring liquid of low specific gravity pressure-responsive to liquid level changes, container means to receive the liquid from the suspended column, a vertically movable pressure cell, liquid means of high specific gravity connecting the container with the pressure cell transmitting pressure effects therebetween, a tubular extension connected to and projecting upwardly from said cell, a volume of low specific gravity liquid immiscibly supported by the heavier liquid in the cell, float responsive electrical contacts in spaced relation in the tubular extension actuated by the level of the low specific gravity liquid, means to raise and lower said cell, and electrical connections between said floats and said means to position the cell indicating the liquid level.

5. A pressure responsive liquid level indicator comprising a cell adapted to receive high specific gravity liquid from a pressure source, a tubular extension operably engaging the cell and opening upwardly thereof, a liquid of substantially lower specific gravity immiscibly supported by the high specific gravity liquid in the cell and extending upwardly into the tubular extension a distance depending on the pressure affecting the supporting liquid, a pair of float operated electrical switches cooperating with the tubular extension and vertically spaced at the extremes of low specific gravity liquid pressure response for the unitary movement of the high specific gravity liquid, a vertically positioned threaded shaft mounted in rotatable engagement with said cell, reversible motor means operably contacting said shaft, and electrical circuit means connecting the float switches with the motor to vertically move the cell in response to pressure transmitted between said liquids.

6. A liquid level measuring system for use with stored liquid bodies comprising a float, a reservoir mounted in the float and adapted to maintain a pressuring liquid of low specific gravity at the level of the liquid body, flexible conduit means connected to the reservoir and conveying the pressuring liquid to a point outside the stored liquid body, a support for said flexible conduit means connected to the float on the upper end and pivotally positioned in the liquid body at the other end carrying the flexible conduit means in the liquid body, an electrical conductor having transmitting characteristics responsive to temperature changes adjacent substantially the submersible length of said flexible conduit means, electrically responsive measuring means connected to the electrical conductor, a body of high specific gravity pressuring liquid positioned to non-miscibly contact the low specific gravity liquid outside the stored liquid body, a vertically responsive pressure cell connected to receive the high specific gravity pressuring liquid pressured from the flexible conduit means, a column of lower specific gravity liquid mounted on said cell in cooperative engagement above the higher specific gravity liquid, upper and lower float means in spaced relation in the column of lower specific gravity liquid and separately responsive to the vertical position thereof, and means to raise and lower said cell in response to the movement of the float means.

7. A liquid level measuring system for use with liquid bodies comprising conduit means adapted to contain a column of pressuring liquid of low specific gravity, a float positioned to support one end of the conduit means at the level of the liquid body, elongate support means pivotally mounted at the bottom of the liquid body and extending into suspending connection with the float to maintain the conduit means in operating relation with said liquid body, an electrical conductor having transmitting characteristics responsive to temperature changes extending longitudinally of the submerged length of said conduit means and support, electrical operating and indicating means connected in circuit with said electrical conductor showing average temperature affecting the submerged pressuring liquid column, a container with high specific gravity liquid positioned to receive the low specific gravity liquid column, a vertically movable indicating cell pressure-connected to said container receiving the high specific gravity liquid therein, a low specific gravity liquid in cooperating engagement with the high specific gravity pressuring liquid in said cell, means electrically responsive to vertically move said cell in accord with level changes in the liquid body, and float actuating elements in the low specific gravity liquid in the cell electrically connected to said vertically moving means.

8. A liquid level measuring system for use with stored liquid bodies comprising a float, a reservoir mounted in the float and adapted to maintain a column of pressuring liquid of low specific gravity suspended from the level of the float contact surface, immersed conduit means supporting the pressuring liquid as a suspended column and connecting said reservoir with a sealed liquid container externally of said liquid body, a hinged support for said flexible conduit pivotally connected to the float and extending to the bottom of the liquid body carrying the conduit means to connection with the sealed container, high specific gravity liquid in the sealed liquid container supporting the low specific gravity pressuring liquid of the suspended column in pressure exchange relation, a vertically movable pressure cell connected to receive an operating portion of the high specific gravity liquid from the sealed container, low specific gravity liquid in said vertically movable pressure cell in pressure exchange relation with the high specific gravity liquid from the sealed container, and operating means cooperating with the low specific gravity liquid in said cell to adjust the vertical height thereof in response to liquid pressures transferred to it, as a gauge of the height of the float on the level of the liquid body.

9. A pressure responsive liquid level measuring system comprising a column of pressuring liquid in the liquid to be measured open to atmospheric pressure and its upper end suspended at the liquid level to be measured, conduit means connecting the column of pressuring liquid to a chamber containing a quantity of pressure transmitting liquid of relatively high specific gravity, further conduit means transferring a quantity of the high specific gravity liquid to the lower portion of a vertically movable cell, a tubular extension open to atmosphere extending upwardly from the lower portion of the cell and in open connection therewith, cell operating liquid of relatively low specific gravity in relation to the pressure transmitting liquid adapted to rise in the tubular extension in response to pressure transmitted to the lower cell portion, liquid operated electric switch means in spaced relation at the bottom and top of said tubular extension, electrically operated means connected to said switch means to raise and lower said cell in response to the actuation of the liquid operated switch means, a first scale adjacent the vertically movable cell indicating units of liquid level measurement, and a second scale adjacent the tubular extension divided into proportionate parts of the units measured, said parts of measurement indicated by the height of the cell operating liquid in said tubular extension.

10. A liquid level measuring system for use with stored liquid bodies comprising a float, a reservoir mounted in the float and adapted to maintain a pressuring liquid of low specific gravity at the level of the liquid body, flexible conduit means connected to the reservoir and conveying the pressuring liquid to a point outside the stored liquid body, a support for said flexible conduit means connected to the float on the upper end and pivotally positioned in the liquid body at the other end carrying the flexible conduit means in the liquid body, a body of high specific gravity pressuring liquid positioned to non-miscibly contact the low specific gravity liquid outside the stored liquid body, a vertically responsive pressure cell connected to receive the high specific gravity pressuring liquid pressured from the flexible conduit means, a column of lower specific gravity liquid mounted on said cell in cooperative engagement above the higher specific gravity liquid, upper and lower float means in spaced relation in the column of lower specific gravity liquid and separately responsive to the vertical position thereof, and means to raise and lower said cell in responsive to the movement of the float means.

11. A liquid level measuring system for use with liquid bodies comprising a conduit means adapted to contain a column of pressuring liquid of low specific gravity, a float positioned to support one end of the conduit means at the level of the liquid body, elongate support means pivotally mounted at the bottom of the liquid body and extended into suspending connection with the float to maintain the conduit means in operating relation with said liquid body, a container with high specific gravity liquid positioned to receive the low specific gravity liquid column, a vertically movable indicating cell pressure-connected to said container receiving the high specific gravity liquid therein, a low specific gravity liquid in cooperating engagement with the high specific gravity pressuring liquid in said cell, means electrically responsive to vertically move said cell in accord with level changes in the liquid body, and float actuating elements in the low specific gravity liquid in the cell electrically connected to said vertically moving means.

References Cited in the file of this patent

UNITED STATES PATENTS

| | | |
|---|---|---|
| 723,040 | Schmitz | Mar. 17, 1903 |
| 1,227,285 | Maher | May 22, 1917 |
| 1,664,265 | Rieber | Mar. 27, 1928 |
| 1,699,812 | Sartakoff | Jan. 22, 1929 |
| 2,380,177 | Hicks | July 10, 1945 |
| 2,677,276 | Schmidt | May 4, 1954 |
| 2,721,480 | Pierce | Oct. 25, 1955 |
| 2,746,293 | Quist | May 22, 1956 |
| 2,760,373 | Quist | Aug. 28, 1956 |